(12) United States Patent
Elskafoss et al.

(10) Patent No.: US 11,260,814 B1
(45) Date of Patent: Mar. 1, 2022

(54) BUG SCREEN AND METHOD OF MOUNTING

(71) Applicant: International Truck Intellectual Property Company, LLC, Lisle, IL (US)

(72) Inventors: Kevin M. Elskafoss, Wheaton, IL (US); Robert D. Charles, St. Charles, IL (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 0 days.

(21) Appl. No.: 17/003,460

(22) Filed: Aug. 26, 2020

(51) Int. Cl.
 B60R 19/52 (2006.01)
(52) U.S. Cl.
 CPC ........ B60R 19/52 (2013.01); *B60R 2019/525* (2013.01)
(58) Field of Classification Search
 CPC .......................... B60R 19/52; B60R 2019/525
 USPC .... 293/115, 117, 142; 296/193.1, 1.07, 1.08
 See application file for complete search history.

(56) References Cited

U.S. PATENT DOCUMENTS

| | | | | |
|---|---|---|---|---|
| 1,811,527 A * | 6/1931 | Young | ............... | B60R 19/52 180/68.6 |
| 2,054,538 A * | 9/1936 | Graves | ............... | B60K 11/04 180/68.6 |
| 2,153,772 A * | 4/1939 | Osten | ............... | B60R 19/52 411/362 |
| 2,726,727 A * | 12/1955 | Vincent | ............... | B60R 19/52 180/68.6 |
| 2,792,254 A * | 5/1957 | Hagglund | ............... | B60J 1/2005 296/91 |
| 2,868,308 A * | 1/1959 | Biewald | ............... | B60J 1/2005 180/68.6 |
| 3,831,696 A * | 8/1974 | Mittendorf | ............... | B60J 1/2005 180/68.6 |
| 3,863,728 A * | 2/1975 | Mittendorf | ............... | B60K 11/04 180/68.6 |
| 3,987,863 A * | 10/1976 | Mittendorf | ............... | B60J 1/2005 180/68.6 |
| 4,052,099 A * | 10/1977 | Lowery | ............... | B60J 1/2005 296/91 |
| 4,085,964 A * | 4/1978 | Hutto | ............... | B60J 1/2005 180/68.6 |
| 4,178,034 A * | 12/1979 | Mittendorf | ............... | B60K 11/04 180/68.6 |

(Continued)

OTHER PUBLICATIONS fla_winter_grille_cover_install.pdf.

(Continued)

*Primary Examiner* — D Glenn Dayoan
*Assistant Examiner* — E Turner Hicks
(74) *Attorney, Agent, or Firm* — Mark C. Bach

(57) ABSTRACT

A bug screen for mounting to a grille of a vehicle comprises a membrane disposed in a frame. At least one slot is disposed on the frame, and at least one platform is disposed on the grille. At least one extension is disposed on the at least one platform. A leg is included in the at least one extension. The leg projects perpendicularly from the at least one platform and has an end opposite to the at least one platform. A barb is disposed on the end of the leg. A sloping surface is disposed on the barb, and the sloping surface passes through the at least one slot on the frame to mount the bug screen to the grille.

1 Claim, 3 Drawing Sheets

(56) References Cited

U.S. PATENT DOCUMENTS

| | | | | |
|---|---|---|---|---|
| 4,627,657 A * | 12/1986 | Daniels | ............... | B60J 1/2005 |
| | | | | 180/68.6 |
| 4,836,598 A * | 6/1989 | Mastin | ............... | B60J 1/2005 |
| | | | | 180/68.6 |
| 4,936,599 A * | 6/1990 | McNamee | ............ | B60J 11/08 |
| | | | | 280/770 |
| 5,562,323 A * | 10/1996 | Wildermuth | ........ | B60J 1/2005 |
| | | | | 296/91 |
| 5,718,283 A * | 2/1998 | Naty | .................. | F01P 11/12 |
| | | | | 165/119 |
| 5,762,374 A * | 6/1998 | Grove | ................. | B60D 1/60 |
| | | | | 280/493 |
| 6,131,681 A * | 10/2000 | Nelson | ............... | B60K 11/08 |
| | | | | 180/68.1 |
| 6,805,389 B1 * | 10/2004 | Schellenberg | ....... | B60R 19/52 |
| | | | | 293/115 |
| 6,810,950 B1 * | 11/2004 | Manze, III | ........... | F28F 9/002 |
| | | | | 165/119 |
| 6,854,545 B1 * | 2/2005 | Elwell | ................ | G09F 21/04 |
| | | | | 180/68.6 |
| 6,892,427 B2 * | 5/2005 | Kinzel | ............... | B62D 35/005 |
| | | | | 24/289 |
| 7,028,797 B2 * | 4/2006 | White | ................ | B60R 19/52 |
| | | | | 160/DIG. 1 |
| 7,537,253 B2 * | 5/2009 | Rosen | ............... | B60R 13/04 |
| | | | | 180/68.4 |
| 7,555,818 B2 * | 7/2009 | Erskine | .............. | E04F 13/0835 |
| | | | | 24/305 |
| 9,333,929 B2 * | 5/2016 | Mettler | ............... | B60R 19/52 |
| 9,475,436 B2 * | 10/2016 | Witkop | ............... | B60R 13/0838 |
| 9,834,162 B1 * | 12/2017 | Grey | .................. | B60R 19/54 |
| 2010/0066118 A1 * | 3/2010 | Miller | ............... | B60J 1/2011 |
| | | | | 296/107.11 |
| 2012/0073767 A1 * | 3/2012 | Graziano | ............. | B60J 11/06 |
| | | | | 160/368.1 |
| 2019/0077351 A1 * | 3/2019 | Mettler | ............... | B60R 19/52 |
| 2020/0369221 A1 * | 11/2020 | Brown | ............... | F16B 37/044 |

OTHER PUBLICATIONS https://www.amazon.com/FIA-HK104-Stick-Stud-Hardware/dp/B000NPPX2W.

Freightliner Cascadia 2018+ Behind Grill Bug Screen—Raney's Truck Parts.pdf.

Grille Spacer-Mount Kit Fits Volvo VNL Gen II—4 State Trucks. pdf.

.pdf.

Freightliner Columbia Behind Grill Bug Screen—Raney's Truck Parts.pdf.

Volvo VNL Behind Grill Bug Screen—Raney's Truck Parts.pdf.

\* cited by examiner

BUG SCREEN AND METHOD OF MOUNTING

BACKGROUND

This disclosure relates generally to a screen and a method for mounting a screen. More specially, this disclosure relates to a bug screen for a vehicle and a method of mounting a bug screen on a vehicle.

Currently, there are a plurality of bug screens that mount behind a grille of a truck. These bug screens are used to reduce likelihood of a foreign article, such as a bug, a rock and the like, contacting and potentially damaging a radiator associated with the truck. Some of these bug screens are substantially similar to the bug screen 10, shown in FIG. 1, mounted behind a grille 12. This bug screen 10 is mounted to the grille 12 by at least one fastener 14. To mount the bug screen 10 to the grille 12, a plurality, often between six (6) and eighteen (18), of fasteners 14, such as a spring clip, a scrivet, a screw, a rivet and the like, is used. During manufacture of a vehicle, this plurality of fasteners 14 may be loaded, sometimes one-by-one, into an assembly machine. This process complicates vehicle manufacture and increases time and cost of vehicle manufacture.

During use of the vehicle, the bug screen 10 may be damaged, thereby making replacement of the bug screen 10 desirable. Each of the plurality of fasteners 14 must be removed carefully to reduce probability of damaging the grille 12. A damaged grille 12 may be expensive. Time taken to remove carefully each of the plurality of fasteners 14 increases time the vehicle must be out of service for repair. This increased repair time reduces ability of the vehicle to generate revenue. Accordingly, it is desirable to improve a bug screen and a method of mounting the bug screen to a grille 12 of a vehicle.

SUMMARY

This disclosure includes embodiments related to a bug screen for a vehicle and a method of mounting a bug screen on a vehicle. One embodiment provides a bug screen for mounting to a grille of a vehicle. A membrane is disposed in a frame. At least one slot is disposed on the frame, and at least one platform is disposed on the grille. At least one extension is disposed on the at least one platform. A leg is included in the at least one extension. The leg projects perpendicularly from the at least one platform and has an end opposite to the at least one platform. A barb is disposed on the end of the leg. A sloping surface is disposed on the barb, and the sloping surface passes through the at least one slot on the frame to mount the bug screen to the grille.

DETAILED DESCRIPTION

Figure 1:
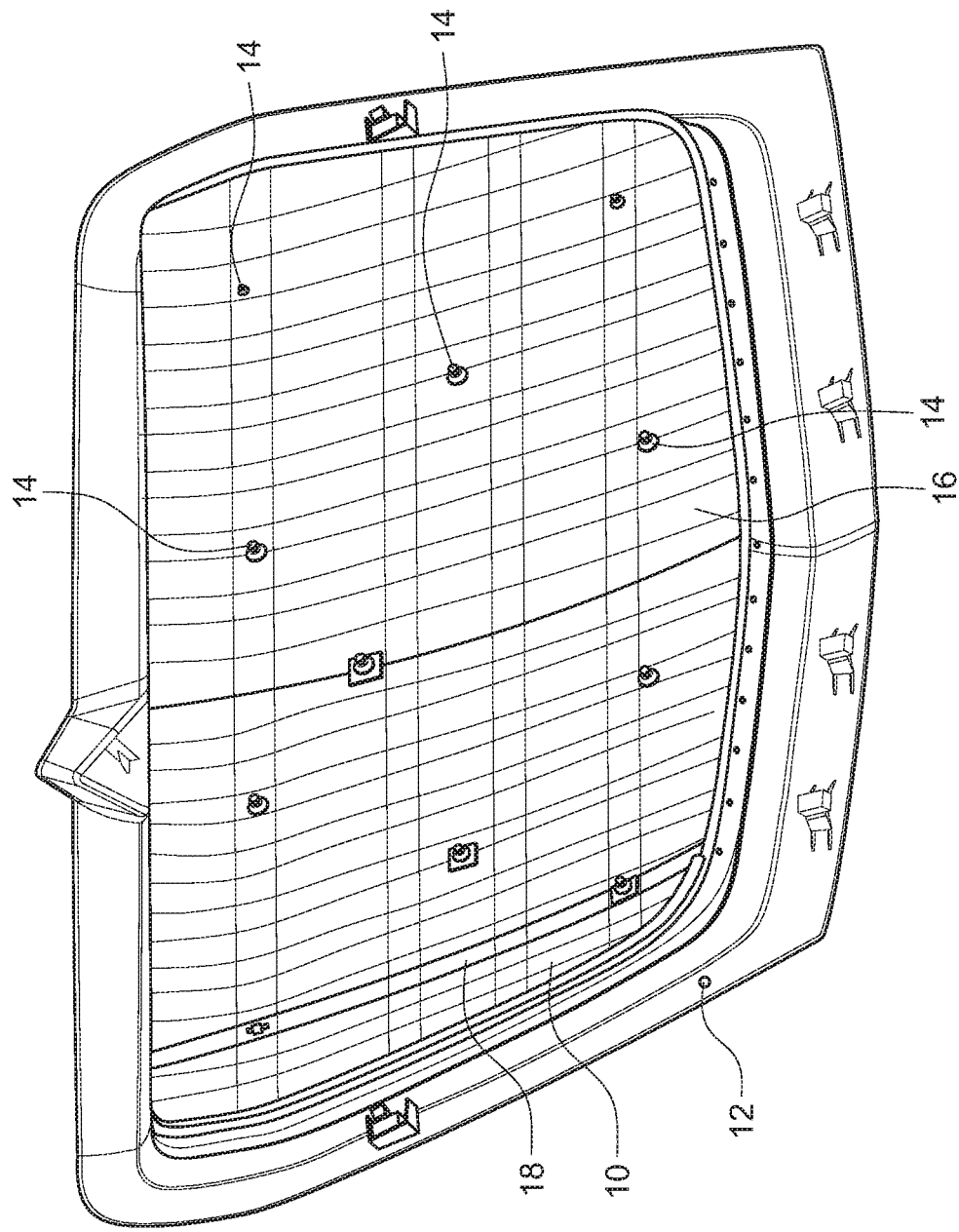
FIG. 1 is a plan view of a bug screen mounted to a grille.

This disclosure relates specifically to a bug screen 10 and to a method of mounting a bug screen 10. The bug screen 10 generally comprises a membrane 16 comprised of suitable material, such wire mesh, wire cloth and the like. The membrane 16 is disposed in a frame 18. The frame 18 comprises any suitable material, such as polymer. One embodiment of the frame 18 comprises a urethane resin, ideally of a high durometer. The frame 18 is attached to the membrane 16. In one embodiment, the frame 18 is over molded the membrane 16 using appropriate methods, such as reaction injection molding and the like. At least one slot 20 is formed in the frame 18. In one embodiment, the at least one slot 20 has a width of about six (6) millimeters.

Figure 2:
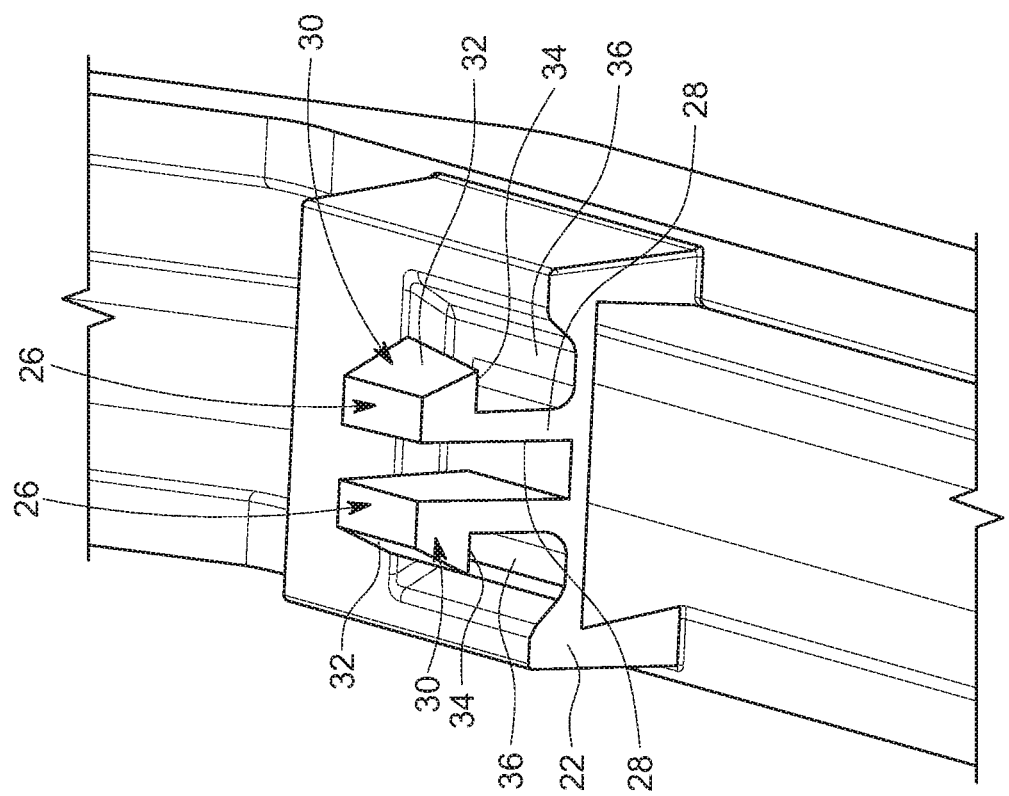
FIG. 2 is an enlarged perspective view of a portion of a bug screen described herein.

As shown in FIG. 2, the grille 12 includes at least one platform 22 that extends rearwardly behind a rear side 24 of the grille 12. The at least one platform 22 may be formed integrally with the grille 12 or may be added, such as by adhesive and the like, to the grille 12 at an appropriate time. At least one extension 26 including a leg 28 and a barb 30 is disposed on the at least one platform 22. The leg 28 projects substantially perpendicularly from the at least one platform 22. The leg 28 has a length that is smaller than a corresponding thickness of the grille 12. The barb 30 comprises a sloping surface 32 and a planar surface 34 that extends substantially perpendicularly to the leg 28. The barb 30 is disposed on the leg 28 on an end thereof opposite to the at least one platform 22. In the illustrated embodiment, on the at least one platform 22, there are two (2) legs 28 each having its own barb 30. The two (2) legs 28 are offset from each other such that the barbs 30 are arranged such that the sloping surfaces 32 of the barbs 30 extend towards the at least one platform 22.

In the illustrated embodiment, the at least one platform 22 includes a trough 36. The trough 36 together with the planar surface 32 of the barb 30 define a distance that is greater than thickness of the frame 18 of the bug screen 10. This arrangement provides pretension when the bug screen 10 is assembled with the grille 12 thereby reducing potential for rattle or shaking of the bug screen 10 during operation of the associated vehicle. This also reduces wear on the frame 18.

With structure of the bug screen 10 being previously described, now attention is drawn to a method of mounting the bug screen 10 on a vehicle, not shown for clarity.

Dimensions of the bug screen 10 and the grille 12 are analyzed to determine number of at least one platforms needed and their locations on the grille 12 to securely mount the bug screen 10 to the grille 12. Locations of the at least one platforms 22 can be selected to reduce visibility of the bug screen 10 behind the grille 12. The at least one platform 22 is fixed on the grille 12. Dimensions of the frame 18 are analyzed with respect to position of the at least one platform 22 to determine number and locations of the at least one slot 20 on the frame 18.

Figure 3:
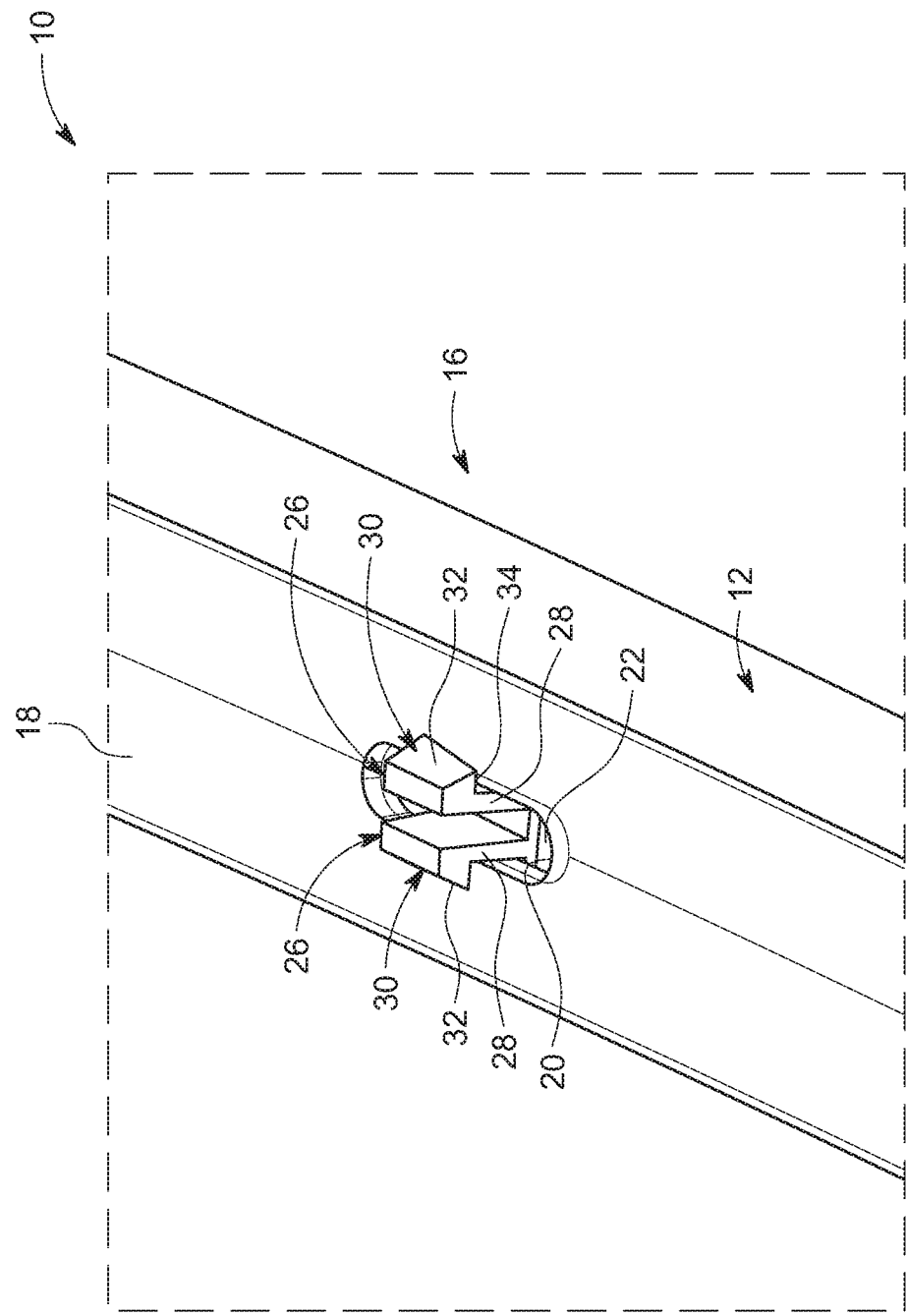
FIG. 3 is an enlarged perspective view of a portion of a big screen described herein mounted to a grille of a vehicle.

With structures of the bug screen 10 and the grille 12 being thusly determined, the bug screen 10 is aligned with the grille 12 such that the sloping surface 32 of the barb 30 of the extension 26 of the at least one platform 22 engages the at least one slot 20 on the frame 18 of the bug screen 10. Distance between the bug screen 10 and the grille 12 is decreased such that the sloping surface 32 of the barb 30 moves through the at least one slot 20 on the frame 18 of the bug screen 10. During this movement, distance between the at least one extensions 26 on the at least one platform 22 can flex on the order of about one (1) millimeter. Distance between the bug screen 10 and the grille 12 decreases until the sloping surface 32 and the planar surface 34 of the barb 30 pass through the at least one slot 20 in the frame 18 of the bug screen 10. This position is shown in FIG. 3. In this position, movement of the bug screen 10 with respect to the grille 12 is limited.

It can be appreciated that embodiments described herein improve over other bug screens currently available. Unlike others, this bug screen 10 is mounted to the grille 12 without any separate fasteners. The bug screen 10 is mounted to the grille 12 by interfacing the at least one slot 20 on the frame 18 of the bug screen 10 with the at least one platform 22 on the grille 12. No other fasteners are needed.

Over time, the bug screen 10 may deteriorate thereby mandating replacement of the bug screen 10. To do this, the bug screen 10 must be removed from the grille 12. The bug screen 10 can be removed from the grille 12 by destructive or nondestructive methods.

Following one destructive method, a technician can use shears and the like to cut away the bug screen 10 from the grille 12.

Following a nondestructive method, a technician may use a tool, such as pliers and the like, to move the at least one extensions 26 closer together. This can allow the sloping surface 32 to engage the at least one slot 20 on the frame 18 of the bug screen 10. The at least one extension 26 can be removed from the at least one slot 20, thereby freeing the bug screen 10 from the grille 12.

What is claimed is:

1. A bug screen for mounting to a grille of a vehicle, the bug screen comprising:
a frame;
  a membrane disposed in the frame;
  at least one slot disposed on the frame;
at least one platform disposed on the grille, interfacing the at least one slot on the frame with the at least one platform on the grille;
  at least one extension disposed on the at least one platform;
  a leg included in the at least one extension, the leg projecting perpendicularly from the at least one platform and having an end opposite to the at least one platform;
  a barb disposed on the end of the leg;
  a sloping surface disposed on the barb, the sloping surface passing through the at least one slot on the frame;
  a planar surface disposed on the barb;
  a trough included on the at least one platform;
  a thickness of the frame; and
  a distance defined by the trough together with the planar surface, the distance being greater than the thickness of the frame.

\* \* \* \* \*